United States Patent [19]

Hicks et al.

[11] Patent Number: 5,263,843

[45] Date of Patent: Nov. 23, 1993

[54] SPLITTABLE DIE USED IN PIPE LINING

[75] Inventors: Kenneth Hicks, Wrekenton; Leslie Maine, Cramlington, both of United Kingdom

[73] Assignee: British Gas plc, London, England

[21] Appl. No.: 713,056

[22] Filed: Jun. 10, 1991

[30] Foreign Application Priority Data

Jul. 2, 1990 [GB] United Kingdom ............... 9014667

[51] Int. Cl.[5] ............................................. B29C 63/42
[52] U.S. Cl. ............................ 425/392; 156/155;
  156/196; 264/320; 425/383; 425/436 R
[58] Field of Search ............... 164/235, 243, 249;
  249/175; 264/35, 242, 265, 320, 249, 267, 269,
  317, DIG. 44; 425/400.1, 451, 451.2, 451.7,
  392, 383, 436 R; 156/196, 155; 72/349, 467

[56] References Cited

U.S. PATENT DOCUMENTS

| 545,978 | 9/1895 | Ransome | 264/267 |
|---|---|---|---|
| 551,079 | 12/1895 | Force et al. | 264/249 |
| 638,616 | 12/1899 | Yost | 164/235 |
| 1,333,212 | 3/1920 | Mummert | 164/235 |
| 1,745,408 | 2/1930 | Creque | 164/249 |
| 2,451,747 | 10/1948 | Kindt | 164/249 |
| 3,124,439 | 3/1964 | Rittenhouse | 264/249 |
| 3,446,167 | 5/1969 | Armbruster et al. | 72/349 |
| 3,592,519 | 7/1971 | Martin | 308/196 |
| 3,662,045 | 5/1972 | Tierling | 264/269 |
| 3,728,196 | 4/1973 | Rausing | 264/516 |
| 4,056,596 | 11/1977 | Pahl | 264/166 |
| 4,135,961 | 1/1979 | Yoshizawa et al. | 264/249 |
| 4,174,365 | 11/1979 | Pahl | 264/221 |
| 4,240,682 | 12/1980 | Benson | 308/216 |
| 4,691,422 | 9/1987 | Tilgner et al. | 264/269 |
| 4,957,268 | 9/1990 | Picollo et al. | 249/175 |
| 5,009,737 | 4/1991 | Lescaut | 264/269 |

FOREIGN PATENT DOCUMENTS

| 0016529 | 1/1980 | European Pat. Off. . | |
| 475456 | 4/1929 | Fed. Rep. of Germany . | |
| 1198620 | 12/1959 | France . | |
| 1579210 | 8/1969 | France . | |
| 62-252621 | 11/1987 | Japan . | |
| WO90/02904 | 3/1990 | PCT Int'l Appl. . | |
| 0602263 | 4/1978 | U.S.S.R. | 72/467 |
| 570623 | 7/1945 | United Kingdom . | |
| 1189135 | 5/1967 | United Kingdom . | |

OTHER PUBLICATIONS

Cubberly, William H., et al, Metals Handbook 9th Ed. vol. I (1979), pp. 3, 5, 6, 11, 12, 13, 14, 15.

Merlub-Sobel, Metals and Alloys Dictionary, Chem. Pub. Co., Inc., Brooklyn, N.Y. (1944) p. 40.

Rolfe, R. T., A Dictionary of Metallography, 2nd Ed. 1949) Chapman & Hall, London, p. 40.

*Primary Examiner*—Jay H. Woo
*Assistant Examiner*—Robert B. Davis
*Attorney, Agent, or Firm*—Larson and Taylor

[57] ABSTRACT

A die for reducing polyethylene pipe temporarily to enable it to be inserted in a pre-existing metal pipe is made of cast iron and has formations by which the die is splittable into two portions. The formations receive cylindrical bars which are squeezed together by a hydraulic squeeze off machine. Each formation is a U-shaped aperture with a saw cut extending from the base of the U into the ligament beneath the formation. The saw cut acts as a stress raiser. In a modification only one formation is provided. The die is made of grey cast iron or some other brittle material.

12 Claims, 4 Drawing Sheets

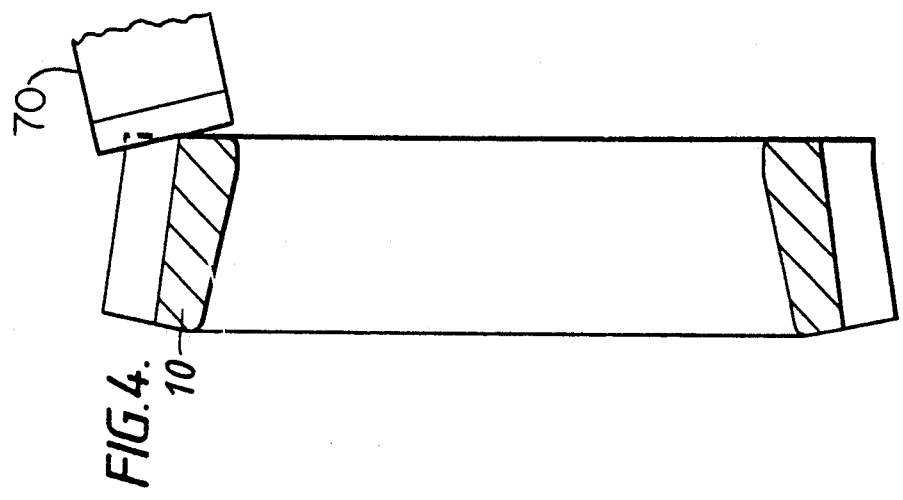
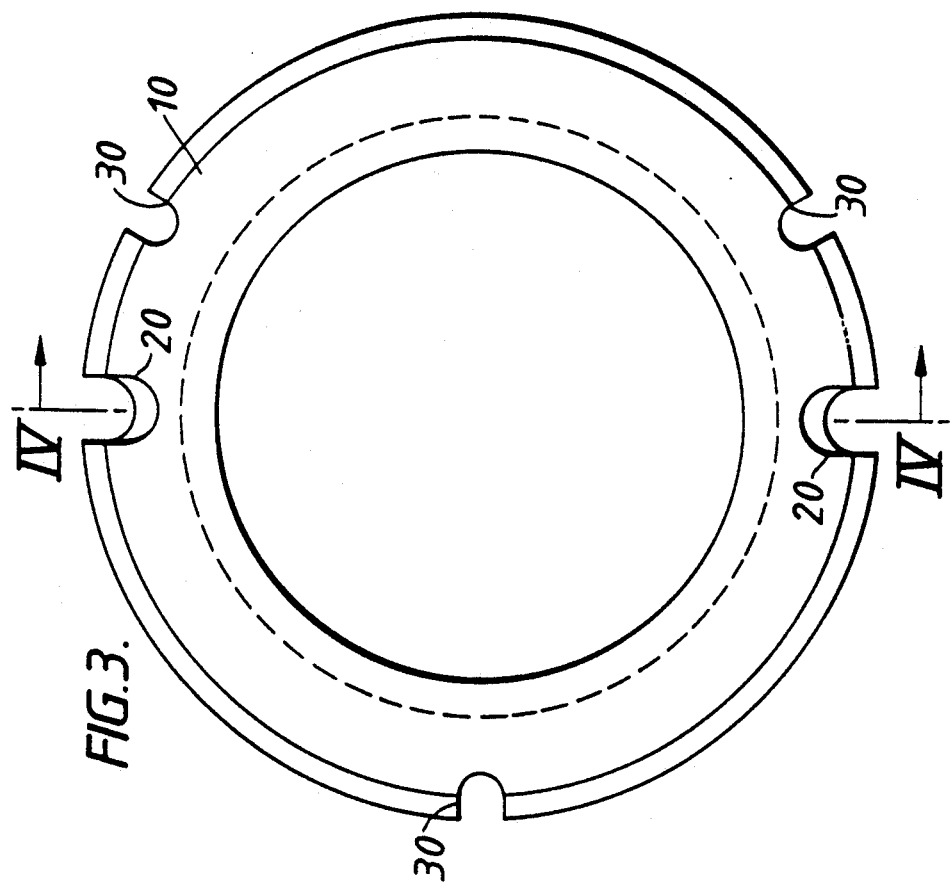

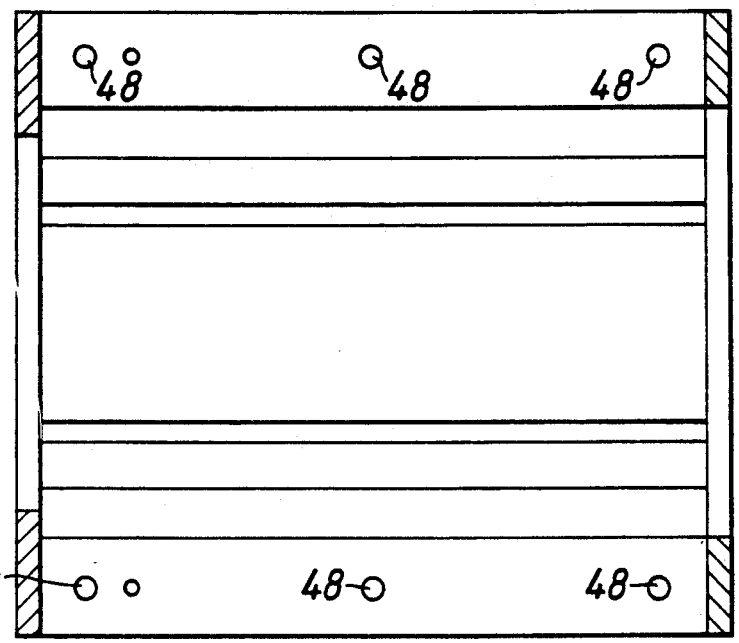
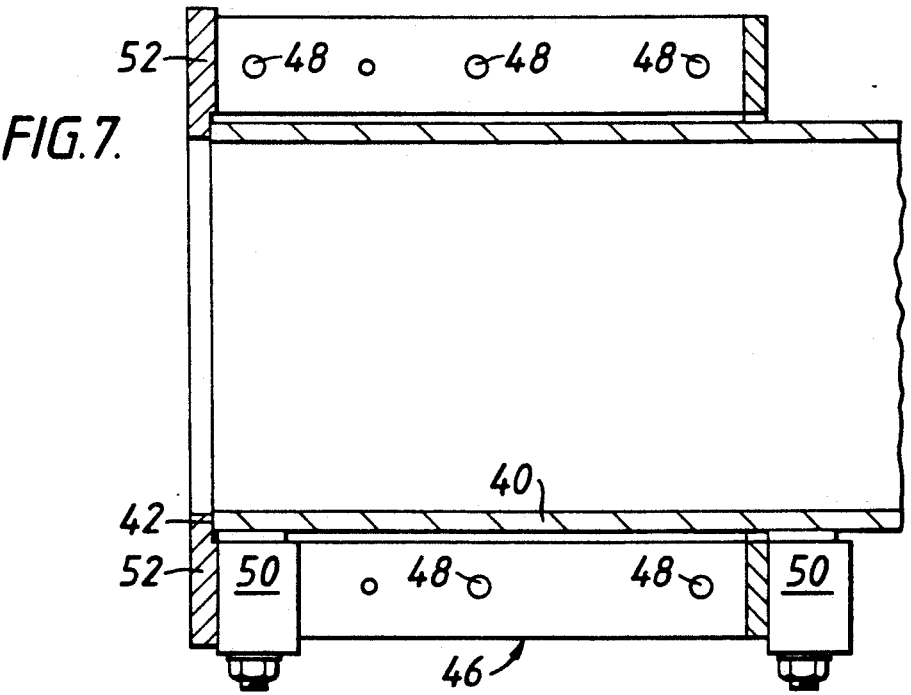

SPLITTABLE DIE USED IN PIPE LINING

This invention relates to splittable dies.

In a method of inserting a plastic pipe in an existing pipe the plastic pipe is pulled through a die and then through the existing pipe. The pulling force is removed and the plastic pipe reverts to a close fit in the existing pipe.

The presence of the die causes a restriction in the plastic pipe in the region of the die.

It is an object of the invention to provide a die which enables that restriction to be removed.

According to the invention, a die comprises a complete ring of brittle material having at least one formation at which force can be applied to split the ring into separate portions.

Preferably, the complete ring is of grey cast iron. In one form of die, the formation, or each of the formations is triangular or V-shaped.

In another form of die the formation, or each of them, is U-shaped.

A saw cut preferably extends from the formation, or each of them, into the ligament of material beneath the formation.

Preferably, the die is split by force applied to a cylindrical bar placed in the formation, or each of them.

Embodiments of dies will now be described by way of example to illustrate the invention with reference to the accompanying drawings in which:

BRIEF DESCRIPTION OF THE DRAWINGS

FIGS. 3 and 4 are each a front elevation, and transverse cross-section on the line IV—IV in FIG. 3, of the die generally as shown in FIG. 2; and FIG. 5, 6 and 7 are each an end elevation; a view on the split line VI—VI; and a view on the split line showing a grey cast iron pipe respectively.

FIG. 1 shows a die 10 made of cast-iron for use with polyethylene pipe used in close-fit lining of a gas pipe or main made of grey cast iron. The die is typically for use in lining a 4-inch or 6-inch main, for example. The die preferably has two diametrally-opposed triangular or V shaped formations 12 which are machined or cast in the material of the die 10. In order to split the die 10 a cylindrical steel bar 14 is preferably placed in each formation 12 and the two bars are squeezed together by means of a squeeze-off tool. In other dies only one formation is provided. The bars 14 are 20 mm in diameter.

FIG. 2 shows the die 10 of grey cast-iron as in FIG. 1 but instead of triangular or V shaped formations the die 10 has two diametrally opposed U-shaped formations 20. A short saw cut 22 extends radially from the base of the U and acts as a stress raiser and induces bending at its tip 24. The die 10 is split as before using bars 14 squeezed together by means of a squeeze-off tool. Alternatively, only one formation is used.

Figure 1:
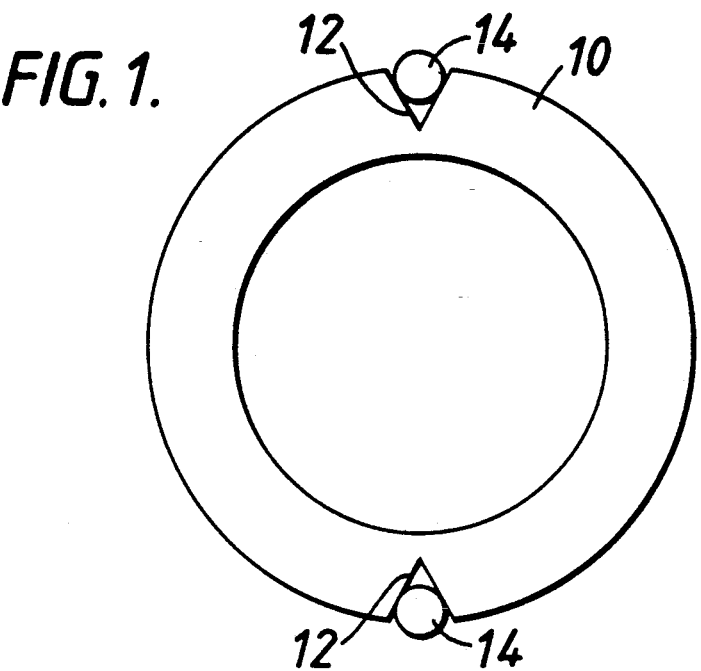
FIGS. 1 and 2 are diagrammatic front elevations of two forms of die.
Figure 2:
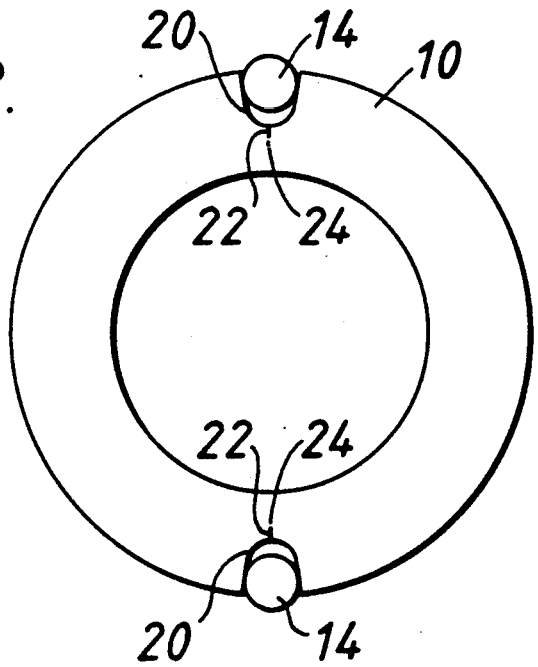

As a typical example of manufacture, the die 10 as shown in FIG. 2 was 50 millimeter thick; the central aperture was 120 mm in diameter; the radial width of the die 10 was 40 mm; the maximum width of the U-shaped formation 20 was 25 mm; the maximum radial width of the ligament underlying the formation 20 was 20 mm; and the saw-cut 22 was 5 mm in length. The curved base of the U formation 20 has an 11 mm radius.

The actual shape of the die 10 as shown in FIG. 2 is shown in FIGS. 3 and 4, for example. There are provided three equiangularly disposed notches 30 to enable the die 10 to be secured to a support ring described with reference to FIGS. 5 to 7 below.

In use, polyethylene pipe is drawn through the die 10 from left to right as viewed in FIG. 4.

The inside surface of the die contacts an outside portion of the liner pipe to effect the reduction of the liner pipe wherein the inside surface of the die has an intermediate portion of minimum diameter smaller than a diameter of the inside surface on either longitudinal side of the die, wherein the die ring has an inside surface which is frustoconically shaped.

Figure 5:
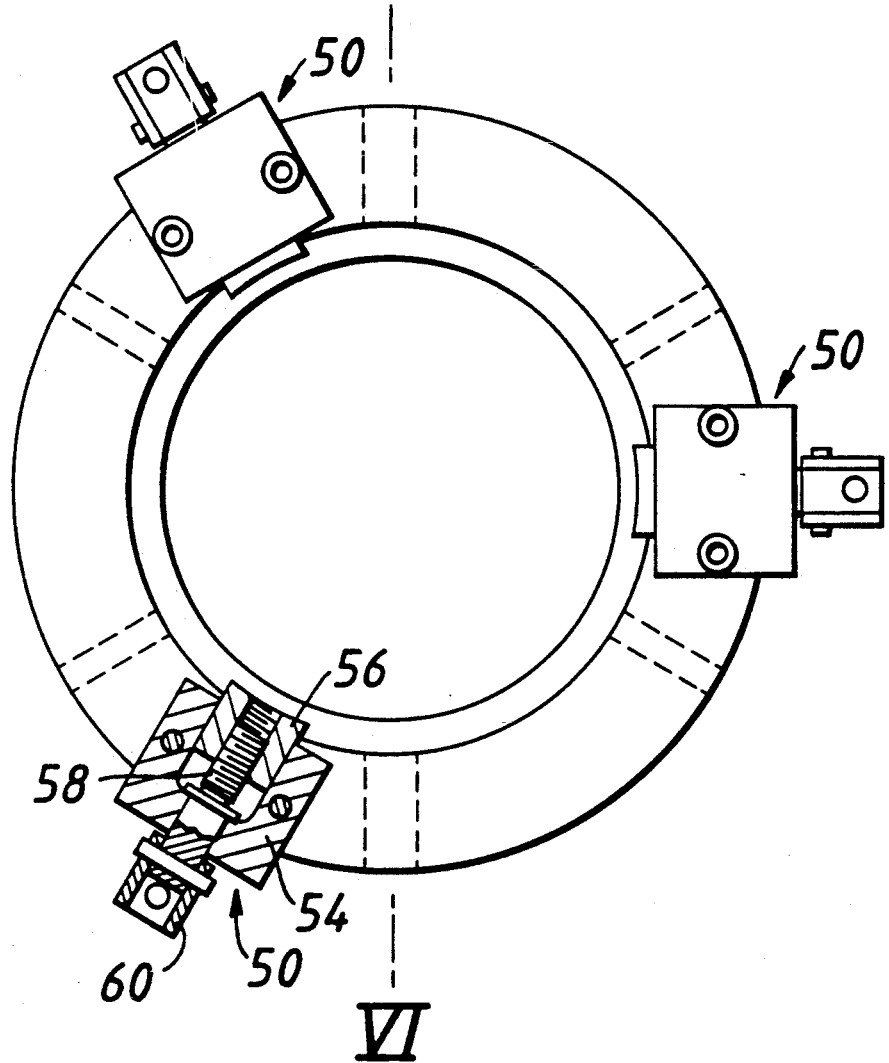

FIGS. 5 and 7 show a cast iron main 40 which is intended to be lined with polyethylene. The end 42 of the main 40 is exposed at an excavation and an assembly 46 is placed over the end 42. The assembly comprises two halves, each comprising two semi-circular end plates joined by four longitudinally extending rib plates.

The assembly 46 is splittable into two halves at the line VI—VI as shown in FIG. 5 by dismantling bolts through the holes 48 in mating rib plates. When assembled upon the end of the main 40 the assembly 46 is complete. The clamps 50 are adjusted so that the assembly 46 (and in particular the die 10 carried by the end plate 52) is coaxial with respect to the bore of the main 40. The assembly shown in FIG. 6 is used to space the die 10 further from the end of the pipe 40. When used, the assembly of FIG. 6 is abutted against the plate 52 of the assembly 46 and the die 10 is mounted at the left hand end of the assembly of FIG. 6.

Each clamp 50 consists of a body 54 within which there is a jaw 56 slidable upon the wall of a bore in the body 54. A screw 58 engages a screwed bore in the jaw 56 and is accessible at 60 outside the body 54.

Although the die 10 shown in FIGS. 3 and 4 has machined faces at the circumferential and end faces as well as the inside bore face, it is preferred to machine only the inside bore face and to leave the other faces as cast. This reduces the cost of the die to a minimum and makes the die an even more expendable item than it is when shown as in FIGS. 3 and 4.

In a modification (not shown) the die is of grey cast iron and is formed with two diametrally opposed, or three equidistant, or some other number of formations each adapted to receive a chisel blade such as a chisel blade 70 shown in FIG. 4. The blade is preferably advanced so that it engages one end of the formation and the chisel is given a blow by a hammer, the chisel thus being advanced parallel to the axis of the polyethylene pipe extending through the die.

The formations may again have saw cuts extending from their bases, as before, if desired. In another modification (not shown) only one formation is provided.

In a modification, the die is made from some other brittle material for example polycarbonate or a material made by powder metallurgy such as a ceramic or metal material for example. Silicon nitride, silicon oxynitride, alumina, aluminium nitride or aluminum oxynitride are examples of this class of material.

We claim:

1. A die system for inserting a liner pipe into an existing pipe comprising:
    a die through which the liner pipe is longitudinally drawn and reduced before entering the existing pipe, said die being formed as a complete and unitary ruing or brittle material having an outside surface, an inside surface, a thickness, a length, and a longitudinal central axis, said inside surface contacting an outside surface of the liner pipe to effect the reduction of the liner pipe and having an intermediate portion of minimum diameter smaller than a diameter of the inside surface on either longitudinal side thereof; and at least one preformed and radially directed recess located in the outside surface of the ring longitudinally along the length thereof, the recess being defined by opposed walls and leaving a ligament of the brittle material between the recess and the inside surface such that a force applied in the recess and against the walls causes the ligament to fail in order to split the ring into separate portions.

2. A die system according to claim 1, wherein the brittle material of the complete ring is grey cast iron.

3. A die system according to claim 1, wherein the at least one recess is V-shaped in lateral cross section.

4. A die system according to claim 3, wherein there are two of the V-shaped recesses located at opposite radial sides of the ring.

5. A die system according to claim 1, wherein the at least one recess is U-shaped in lateral cross section.

6. A die system according to claim 5, wherein there are two of the U-shaped recesses located at opposite radial sides of the ring.

7. A die system according to claim 6, wherein the inside surface of the ring is frustoconical shaped, and further including a supporting ring assembly for attaching the ring to the existing pipe and three notches in the outside surface and located at equal radial positions around the outside surface of the ring to enable the ring to be secured to the supporting ring assembly.

8. A die system according to claim 7, and further including a respective cylindrical bar which is placed in each respective recess so as to engage the walls thereof, and a splitting means for forcing the cylindrical bars further into the associated recess and hence causing the ligaments of material to fail and the ring to be split.

9. A die system according to claim 1, and further including a saw cut extending from the recess into the ligament of material.

10. A die system according to claim 1, and further including a cylindrical bar which is placed in the recess so as to engage the walls thereof, and a splitting means for forcing the cylindrical bar further into the recess and hence causing the ligament of material to fail and the ring to be split.

11. A die system according to claim 1, and further including a chisel blade which engages the walls of the recess so that as the chisel blade engages one longitudinal end of the recess the chisel blade is given a blow by a hammer to advance the chisel blade through a longitudinal portion of the ligament of material and parallel to the longitudinal axis of the liner pipe extending through the ring.

12. A die system according to claim 1 wherein said ring includes longitudinal ends, and wherein said inside surface of said ring adjacent each end includes a respective rounded portion.

* * * * *